United States Patent
Inoue et al.

(10) Patent No.: US 6,753,400 B2
(45) Date of Patent: Jun. 22, 2004

(54) ROOM TEMPERATURE CURING ORGANOPOLYSILOXANE COMPOSITION

(75) Inventors: Yoshifumi Inoue, Annaka (JP); Hiroshi Mogi, Annaka (JP); Kouichi Tanaka, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/266,685

(22) Filed: Oct. 9, 2002

(65) Prior Publication Data

US 2003/0069379 A1 Apr. 10, 2003

(30) Foreign Application Priority Data

Oct. 10, 2001 (JP) ........................................ 2001-312428

(51) Int. Cl.$^7$ ........................... C08G 77/08; C08L 83/06
(52) U.S. Cl. ........................... 528/14; 528/12; 528/19; 528/34; 524/425; 524/588
(58) Field of Search ............................. 528/12, 14, 19, 528/34; 524/588, 425

(56) References Cited

U.S. PATENT DOCUMENTS

| | | | | |
|---|---|---|---|---|
| 3,694,478 A | * | 9/1972 | Adams et al. | 556/417 |
| 3,819,549 A | * | 6/1974 | Imai et al. | 524/863 |
| 4,395,526 A | * | 7/1983 | White et al. | 528/18 |
| 4,460,739 A | * | 7/1984 | Ashby | 524/702 |
| 5,356,954 A | * | 10/1994 | Adachi et al. | 523/200 |
| 5,910,555 A | * | 6/1999 | Ueda et al. | 528/34 |
| 6,166,121 A | * | 12/2000 | Nishiumi et al. | 524/425 |
| 6,288,143 B1 | * | 9/2001 | Caradori et al. | 523/213 |
| 2002/0040102 A1 | * | 4/2002 | Nixon | 525/100 |

\* cited by examiner

*Primary Examiner*—Jeffrey B. Robertson
(74) *Attorney, Agent, or Firm*—Oblon, Spivak, McClelland, Maier & Neustadt, P.C.

(57) ABSTRACT

A room temperature curing organopolysiloxane composition is provided which displays no toxicity, is resistant to cracking and discoloration, cures rapidly, and yields a cured product of good hardness. This composition includes (A) an organopolysiloxane with at least two hydroxyl groups bonded to silicon atoms within a single molecule, (B) an organosilicon compound represented by a formula (I) shown below, and/or a partial hydrolysis condensate thereof, $$R_a SiX_{4-a} \qquad (I)$$

(wherein, R represents a substituted or unsubstituted monovalent hydrocarbon of 1 to 10 carbon atoms, X represents a hydrolysable group, and a represents an integer of 0 to 3), and (C) a bismuth compound-based curing catalyst.

14 Claims, No Drawings

ROOM TEMPERATURE CURING ORGANOPOLYSILOXANE COMPOSITION

BACKGROUND OF THE INVENTION

1. Field of the Invention

The present invention relates to room temperature curing organopolysiloxane composition effective as a sealing material or a coating material.

2. Description of the Prior Art

Compositions for which curing occurs at normal room temperature through the action of moisture in the air to form a silicone rubber, so-called condensation reaction type room temperature curing silicone rubber compositions, are well known. These compositions are widely used as sealing materials, industrial adhesives and potting materials and the like in a variety of fields including machinery, electrical and electronic devices and architecture and building.

The curing catalyst used in these compositions is typically a tin compound or a titanium compound. However, in the case of tin compounds, various problems arise such as the problem of toxicity, and fragmentation of the backbone chain of organopolysiloxane molecules, leading to cracking and a reduction in the degree of hardness over time. Furthermore, in the case of titanium compounds, different problems arise such as a slow curing time or discoloration.

Furthermore, Japanese Laid-open publication (kokai) No. 2000-129126 (JP2000-129126A) discloses that a bivalent bismuth carboxylate is effective as a curing catalyst for a polyoxyalkylene polymer with a hydrolysable silicon group. However, the curing speed of these compositions is inadequate, and moreover no comment is made in the application of potential application to silicone systems.

Furthermore, bismuth naphthenate has been presented as a possible curing catalyst for room temperature curing organopolysiloxane compositions in U.S. Pat. No. 3,161,614 and U.S. Pat. No. 3,175,993, although no examples are presented, and the polymer systems reported are also different from those described in the present invention.

SUMMARY OF THE INVENTION

An object of the present invention is to provide a room temperature curing organopolysiloxane composition which does not use a catalyst based on any of the aforementioned conventional tin or titanium compounds, which exhibits no problems of toxicity, cracking or discoloration and the like, and which moreover cures rapidly, and produces a cured product of good hardness.

In order to achieve the above object, the present invention provides a room temperature curing organopolysiloxane composition comprising:

(A) an organopolysiloxane with at least two hydroxyl groups bonded to silicon atoms within a single molecule,
(B) an organosilicon compound represented by a formula (I) shown below, and/or a partial hydrolysis condensate thereof,

(wherein, R represents a substituted or unsubstituted monovalent hydrocarbon of 1 to 10 carbon atoms, X represents a hydrolysable group, and a represents an integer of 0 to 3), and
(C) a bismuth compound-based curing catalyst.

DETAILED DESCRIPTION OF THE PREFERRED EMBODIMENTS

As follows is a more detailed description of each of the constituents (A), (B) and (C) of a room temperature curing organopolysiloxane composition according to the present invention.

[Constituent (A)]

An organopolysiloxane of the constituent (A) has at least two hydroxyl groups bonded to silicon atoms within a single molecule, and should preferably have a viscosity at 25° C. of 100 to 500,000 mm²/s, and even more preferably from 1,000 to 100,000 mm²/s. Compounds represented by the formula (II) shown below, with hydroxyl groups at both terminals, are particularly suitable.

In this formula, $R^1$ and $R^2$ may be the same or different, and represent the same or different substituted or unsubstituted monovalent hydrocarbon groups of 1 to 10 carbon atoms, and preferably 1 to 8 carbon atoms. Suitable examples include alkyl groups such as methyl groups, ethyl groups, propyl groups and butyl groups; cycloalkyl groups such as cyclohexyl groups; alkenyl groups such as vinyl groups and allyl groups; aryl groups such as phenyl groups and tolyl groups; aralkyl groups such as benzyl groups and phenylethyl groups; as well as groups in which all, or a portion of the hydrogen atoms bonded to carbon atoms within these groups are substituted with a halogen atom or a cyano group or the like, such as chloromethyl groups, trifluoropropyl groups or cyanoethyl groups; and of these, methyl groups and phenyl groups are preferred, and methyl groups are particularly desirable. n represents a number of repeating units which will preferably generate a viscosity at 25° C. for the diorganopolysiloxane of 100 to 500,000 mm²/s, and even more preferably from 1,000 to 100,000 mm²/s.

[Constituent (B)]

The constituent (B) is a cross linking agent, and is an organosilicon compound represented by the formula $R_aSiX_{4-a}$, and/or a partial hydrolysis condensate thereof. In the formula, R represents the same or different substituted or unsubstituted monovalent hydrocarbon groups of 1 to 10 carbon atoms, and preferably 1 to 8 carbon atoms. Suitable examples include alkyl groups such as methyl groups, ethyl groups, propyl groups and butyl groups; cycloalkyl groups such as cyclohexyl groups; alkenyl groups such as vinyl groups and allyl groups; aryl groups such as phenyl groups and tolyl groups; aralkyl groups such as benzyl groups and phenylethyl groups; as well as groups in which all, or a portion of the hydrogen atoms bonded to carbon atoms within these groups are substituted with a halogen atom or a cyano group or the like, such as chloromethyl groups, trifluoropropyl groups, or cyanoethyl groups; and of these, methyl groups, ethyl groups, vinyl groups and phenyl groups are preferred. a represents an integer of 0 to 3.

X is a hydrolysable group, and suitable examples include alkoxy groups, ketooxime groups, 1-methylvinyloxy groups and acetoxy groups and the like, although of these, alkoxy groups, ketooxime groups and acetoxy groups are preferred, and alkoxy groups are particularly desirable.

In those cases in which X is a ketooxime group, specific examples of the constituent (B) include silane compounds such as methyltris(diethylketooxime)silane, methyltris(methylethylketooxime)silane, vinyltris(methylethylketooxime)silane and phenyltris(diethylketooxime)silane, or partial hydrolysis condensates thereof.

In those cases in which X is an alkoxy group, specific examples of the constituent (B) include silane compounds such as trimethoxymethylsilane, trimethoxyphenylsilane, trimethoxyvinylsilane, triethoxymethylsilane, triethoxyphenylsilane, triethoxyvinylsilane and tetramethoxysilane, or partial hydrolysis condensates thereof.

These compounds may be used singularly, or in combinations of two or more compounds.

The quantity of the constituent (B) used is preferably 1 to 30 parts by weight, and even more preferably 3 to 20 parts by weight per 100 parts by weight of the constituent (A). At quantities less than 1 part by weight the stability of the composition deteriorates, and the composition may gel during storage, whereas if the quantity exceeds 30 parts by weight, the curing shrinkage becomes overly large and the physical properties of the cured product deteriorate.

[Constituent (C)]

The bismuth compound-based curing catalyst of the constituent (C) is a particularly important constituent of a room temperature curing composition according to the present invention.

There are no particular restrictions on the bismuth compound-based curing catalyst of the constituent (C), provided it acts as a catalyst for the condensation reaction between the constituent (A) and the constituent (B), although organic bismuth compounds are preferred, and bismuth carboxylates are particularly preferred. Of these, trivalent bismuth carboxylates are particularly preferred, as represented by the general formula (III) shown below.

$$(R^3CO_2)(R^4CO_2)(R^5CO_2)Bi \qquad (III)$$

(wherein, $R^3$, $R^4$ and $R^5$ may be the same or different, and represent a saturated or unsaturated hydrocarbon group of 1 to 20 carbon atoms, and preferably 1 to 10 carbon atoms.)

Of these compounds, straight chain or branched chain alkyl-based carboxylates of trivalent bismuth are particularly preferred, and by using these compounds, compositions with particularly superior curability can be achieved.

Specific examples of these bismuth compounds are presented below:

$(CH_3CO_2)_3Bi$, $(C_2H_5CO_2)_3Bi$, $(C_7H_{15}CO_2)_3Bi$, $(C_9H_{19}CO_2)_3Bi$, $(C_3H_7CO_2)_3Bi$, $(C_4H_9CO_2)_3Bi$, $(C_5H_{11}CO_2)_3Bi$, $(C_6H_{13}CO_2)_3Bi$, $(C_6H_{13}CO_2)_3Bi$, $(CH_3CO_2)(C_7H_{15}CO_2)_2Bi$, and $(C_7H_{15}CO_2)(C_9H_{19}CO_2)_2Bi$.

The constituent (C) must be present in a sufficient quantity to act as an effective catalyst, and specifically, quantities of 0.01 to 20 parts by weight, and preferably 0.1 to 10 parts by weight are required per 100 parts by weight of the constituent (A).

[Other Constituents]

Where necessary, constituents other than the aforementioned constituent (A) to (C) may be added to a composition of the present invention, provided such addition does not impair the properties of the composition such as the curability, and the resistance to cracking and discoloration.

Examples of other constituents include fibrous materials such as asbestos, glass fiber, carbon fiber and organic fibers, fillers such as silica, talc, carbon black, bentonite, calcium carbonate, zinc carbonate, zinc oxide, magnesium oxide and celite, network polyorganosiloxane resins formed from tri-organosiloxane units and $SiO_2$ units, heat resistance enhancing agents or cold resistance enhancing agents such as red iron oxide and cerium oxide, waterproofing agents, rust proofing agents, antibacterial agents, mold proofing agents, plasticizers, coloring agents, and fire resistance imparting agents. In addition, the various carbon functional silanes may also be added to improve adhesion.

In particular, the addition of silica and/or calcium carbonate as a filler is desirable. Silica may be either fumed silica or precipitated silica, although fumed silica is preferred, and silica which has undergone hydrophobic surface treatment is particularly preferred. Either untreated calcium carbonate or calcium carbonate which has undergone hydrophobic surface treatment may be used.

The quantity of the filler should be from 1 to 200 parts by weight, and preferably from 3 to 100 parts by weight per 100 parts by weight of the organopolysiloxane of the constituent (A).

EXAMPLES

A composition of the present invention can be produced by mixing the constituents (A) to (C), and where necessary other constituents. There are no particular restrictions on the order in which the constituents are combined, although the constituents should preferably be mixed under substantially anhydrous conditions.

As follows is a description of specific examples, although the present invention is in no way limited to the examples presented below.

Example 1

The constituent (A) was prepared by mixing 100 parts by weight of a polydimethylsiloxane with hydroxyl groups at both terminals and a viscosity of 20,000 $mm^2/s$, with 13 parts by weight of treated silica (Aerosil R972 (manufactured by Degussa Co., Ltd.)) in a double planetary mixer, and following degassing, 3 parts by weight of vinyltriethoxysilane as the constituent (B), and 0.7 parts by weight of bismuth tris(2-ethylhexanoate) as the constituent (C) were added, mixed and degassed, to yield a composition 1.

This composition had a pot life of 2 hours, and after 16 hours had completely cured to a depth 10 cm below the surface.

Example 2

The constituent (A) was prepared by mixing 100 parts by weight of a polydimethylsiloxane with hydroxyl groups at both terminals and a viscosity of 20,000 $mm^2/s$, with 13 parts by weight of treated silica (Aerosil R972 (manufactured by Degussa Co., Ltd.)) in a double planetary mixer, and following degassing, 3 parts by weight of vinyltri(methylethylketooxime)silane as the constituent (B), and 0.7 parts by weight of bismuth tris(2-ethylhexanoate) as the constituent (C) were added, mixed and degassed, to yield a composition II.

This composition had a pot life of 2 hours, and after 16 hours had completely cured to a depth 10 cm below the surface.

Comparative Example 1

The constituent (A) was prepared by mixing 100 parts by weight of a polydimethylsiloxane with hydroxyl groups at both terminals and a viscosity of 20,000 $mm^2/s$, with 13 parts by weight of treated silica (Aerosil R972 (manufactured by Degussa Co., Ltd.)) in a double planetary mixer, and following degassing, 3 parts by weight of vinyltriethoxysilane as the constituent (B), and 0.7 parts by weight of dimethyl tin laurate (instead of the bismuth tris(2-ethylhexanoate) of the constituent (C) of the example 1) were added, mixed and degassed, to yield a comparative composition a.

This composition had a pot life of 2 hours, and after 16 hours had completely cured to a depth 10 cm below the surface.

Comparative Example 2

The constituent (A) was prepared by mixing 100 parts by weight of a polydimethylsiloxane with hydroxyl groups at both terminals and a viscosity of 20,000 mm²/s, with 13 parts by weight of treated silica (Aerosil R972 (manufactured by Degussa Co., Ltd.)) in a double planetary mixer, and following degassing, 3 parts by weight of vinyltri(methylethylketooxime)silane as the constituent (B), and 0.7 parts by weight of dimethyl tin laurate (instead of the bismuth tris(2-ethylhexanoate) of the constituent (C) of the example 2) were added, mixed and degassed, to yield a comparative composition b.

Even after 16 hours, this composition had not completely cured to a depth 10 cm below the surface.

The above compositions I, II and the comparative composition a were each placed in a 10 cm tall glass bottle and left to stand and cure for 16 hours at room temperature, and the cured products were subsequently heat treated at 80° C. for a further 24 hours. The hardness of the thus obtained cured products was measured using the Durometer A scale. The results are shown in Table 1.

TABLE 1

|  | Initial hardness | Hardness following heat treatment |
|---|---|---|
| Example 1 | 25 | 25 |
| Example 2 | 27 | 24 |
| Comparative Example 1 | 25 | 9 |

The hardness of the compositions of example 1 and 2 was maintained very well, whereas for the comparative example 1, the hardness fell markedly as a result of the heat treatment. Furthermore, no cracking occurred in the examples even following the aforementioned heat treatment, whereas in the comparative example 1, it is assumed that the observed hardness results were a result of cracking of the polysiloxane principal chain.

Example 3

The constituent (A) was prepared by mixing 100 parts by weight of a polydimethylsiloxane with hydroxyl groups at both terminals and a viscosity of 5,000 mm²/s, with 30 parts by weight of (untreated) calcium carbonate in a double planetary mixer, and following degassing, 3 parts by weight of methyltrimethoxysilane as the constituent (B), and 0.7 parts by weight of bismuth tris(neodecanoate) as the constituent (C) were added, mixed and degassed, to yield a composition III.

This composition had a pot life of 1.5 hours, and after 16 hours had completely cured to a depth 10 cm below the surface. Furthermore, no variation in the hardness of the cured product was observed following heat treatment under the same conditions as described above.

A room temperature curing organopolysiloxane composition of the present invention displays good handling and rapid curability, does not undergo cracking and maintains a good level of hardness upon heat treatment, and does not suffer from problems of toxicity or discoloration.

What is claimed is:

1. A room temperature curing organopolysiloxane composition comprising:
    (A) an organopolysiloxane with at least two hydroxyl groups bonded to silicon atoms within a single molecule,
    (B) an organosilicon compound represented by a formula (I) shown below, and/or a partial hydrolysis condensate thereof, $$R_aSiX_{4-a} \quad (1)$$

wherein, R represents a substituted or unsubstituted monovalent hydrocarbon of 1 to 10 carbon atoms, X represents a hydrolysable group, and a represents an integer of 0 to 3, and
    (C) a trivalent bismuth carboxylate curing catalyst.

2. The composition according to claim 1, wherein the organopolysiloxane of the constituent (A) has at least two hydroxyl groups bonded to silicon atoms within a single molecule, and has a viscosity at 25° C. of 100 to 500,000 mm²/s.

3. The composition according to claim 1, wherein the organopolysiloxane of the constituent (A) is represented by the formula (II):

$$HO(R^1R^2SiO)_n \quad (II)$$

wherein each $R^1$ and each $R^2$ are independently represent a substituted or unsubstituted monovalent hydrocarbon group of 1 to 10 carbon atoms, and n represents a number of the repeating units which generate a viscosity at 25° C. for the organopolysiloxane of 100 to 500,000 mm²/s.

4. The composition according to claim 3, wherein said substituted or unsubstituted monovalent hydrocarbon group is an alkyl group, an alkenyl group, an aryl group, an aralkyl group, or a group in which all or a portion of the hydrogen atoms bonded to carbon atoms within these groups are substituted with a halogen atom or a cyano group.

5. The composition according to claim 1, wherein said substituted or unsubstituted monovalent hydrocarbon group within said formula (I) of said constituent (B) is an alkyl group, a cycloalkyl group, an alkenyl group, an aryl group, an aralkyl group, or a group in which all or a portion of the hydrogen atoms bonded to carbon atoms within these groups are substituted with a halogen atom or a cyano group.

6. The composition according to claim 1, wherein X within said formula (I) of said constituent (B) has an alkoxyl group, a ketooxime group or an acetoxy group.

7. The composition according to claim 1, wherein the organosilicon compound said constituent (B) comprises at least one silane compound selected from the group consisting of methyltris(diethylketooxime)silane, methyltris(methylethylketooxime)silane, vinyltris(methylethylketooxime)silane, phenyltris(diethylketooxime)silane, trimethoxymethylsilane, trimethoxyphenylsilane, trimethoxyvinylsilane, triethoxymethylsilane, triethoxyphenylsilane, triethoxyvinylsilane, tetramethoxysilane, and partial hydrolysis condensates thereof.

8. The composition according to claim 1, wherein the trivalent bismuth carboxylate is represented by the formula (III):

$$(R^3CO_2)(R^4CO_2)(R^5CO_2)Bi \quad (III)$$

wherein, $R^3$, $R^4$ and $R^5$ are the same or different, and each represent a saturated or unsaturated hydrocarbon group of 1 to 20 carbon atoms.

9. The composition according to claim 8, wherein $R^3$, $R^4$ and $R^5$ in the formula (III) each represent a straight chain or branched chain alkyl group.

10. The composition according to claim 9, wherein the trivalent bismuth carboxylate includes at least one selected from the group consisting of $(CH_3CO_2)_3Bi$, $(C_2H_5CO_2)_3Bi$, $(C_7H_{15}CO_2)_3Bi$, $(C_9H_{19}CO_2)_3Bi$, $(C_3H_7CO_2)_3Bi$, $(C_4H_9CO_2)_3Bi$, $(C_5H_{11}CO_2)_3Bi$, $(C_6H_{13}CO_2)_3Bi$, $(CH_3CO_2)(C_7H_{15}CO_2)_2Bi$, and $(C_7H_{15}CO_2)(C_9H_{19}CO_2)_2Bi$.

11. The composition according to claim 1, wherein the constituent (B) is present in an amount of 1 to 3 parts by weight, and the constituent (C) is present in an amount of 0.01 to 20 parts by weight, per 100 parts by weight of the constituent (A).

12. The composition according to claim 1, further comprising a filler.

13. The composition according to claim 12, wherein said filler includes a silica and/or calcium carbonate.

14. The composition according to claim 12, wherein said filler is present in an amount of 1 to 200 parts by weight per 100 parts by weight of the organopolysiloxane of the constituent (A).

* * * * *